T 862017

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MAY 27, 1969

862 O.G. 1010

767,845

UNSATURATED, CURABLE POLYESTERS CONTAINING AROMATIC SULFONATE SALT GROUPS

John R. Caldwell, P.O. Box 511, Kingsport, Tenn. 37662

Filed Oct. 15, 1968. Published May 27, 1969
Int. Cl. C08g *17/13*
U.S. Cl. 260—49
No Drawing. 12 Pages Specification

Curable polyesters of (A) a glycol, (B) an unsaturated dicarboxylic acid of 4 carbon atoms, and (C) a compound having the structure:

$$\begin{array}{c} R-Z-R' \\ | \\ (SO_3M)_n \end{array}$$

wherein Z is an aromatic ring, R is a group capable of forming an ester linkage, R′ is R or H, M is a metallic element, and $n$ is a number having a value of 1 or 2, are useful as anti-static finishes for polyester fibers and films and for improving the basic-dyeability of said fibers and films.